March 19, 1957  W. D. YOUNG  2,785,803
UPFLOW WATER FILTER
Filed May 16, 1955  3 Sheets-Sheet 1

INVENTOR
WILLIAM D. YOUNG

BY
Young Wright
ATTORNEYS

March 19, 1957 W. D. YOUNG 2,785,803
UPFLOW WATER FILTER
Filed May 16, 1955 3 Sheets-Sheet 3

INVENTOR
WILLIAM D. YOUNG

BY
*Young Wright*
ATTORNEYS

United States Patent Office 2,785,803
Patented Mar. 19, 1957

2,785,803

UPFLOW WATER FILTER

William D. Young, Milwaukee, Wis., assignor to Youman Products, Inc., a corporation of Wisconsin Application May 16, 1955, Serial No. 508,516

3 Claims. (Cl. 210—134)

This invention appertains to water purification and more specifically to a novel filter particularly adapted for home use and designed to be interposed in the water supply line for a house, whether said line leads from a well (pressure tank) or a city water supply system.

One of the primary objects of my invention is to provide an upflow water filter, whereby the water will be forced up under its pressure through the various stratas of filtering media before leaving the outlet of the filter at the upper end of the filter casing.

Another salient object of my invention is to provide a water filter with novel means for holding and sealing the filtering material in place in the bowl of the filter casing, so that by-passing of water around the filtering material is prevented.

A further object of my invention is the provision of a water filter embodying a bowl for the reception of loose filtering material, such as a preferred type of silica, with means for sealing the material in the bottom of the bowl including a filter retaining pad, a foraminous cage for the reception of a second filtering material, such as activated carbon and a second retaining pad with means on the cover of the bowl for tightly holding the various parts of the filter in proper relation in the bowl.

A further important object of my invention is the provision of novel means for distributing water through the loose silica bed as the water enters in the bowl and for agitating the silica each time water is drawn through the bowl.

A still further object of my invention is to provide a water filter of the above character, which will be durable and efficient in use, one that can be easily cleaned and repacked with the desired filtering media and one which can be placed upon the market at a reasonable cost.

With these and other objects in view, the invention consists in the novel arrangement, construction and formation of parts, as will be hereinafter more specifically described and claimed, and illustrated in the accompanying drawings, in which drawings, Figure 1 is a side elevational view of my improved filter with parts thereof broken away and in vertical section to illustrate structural detail;

Figure 1:
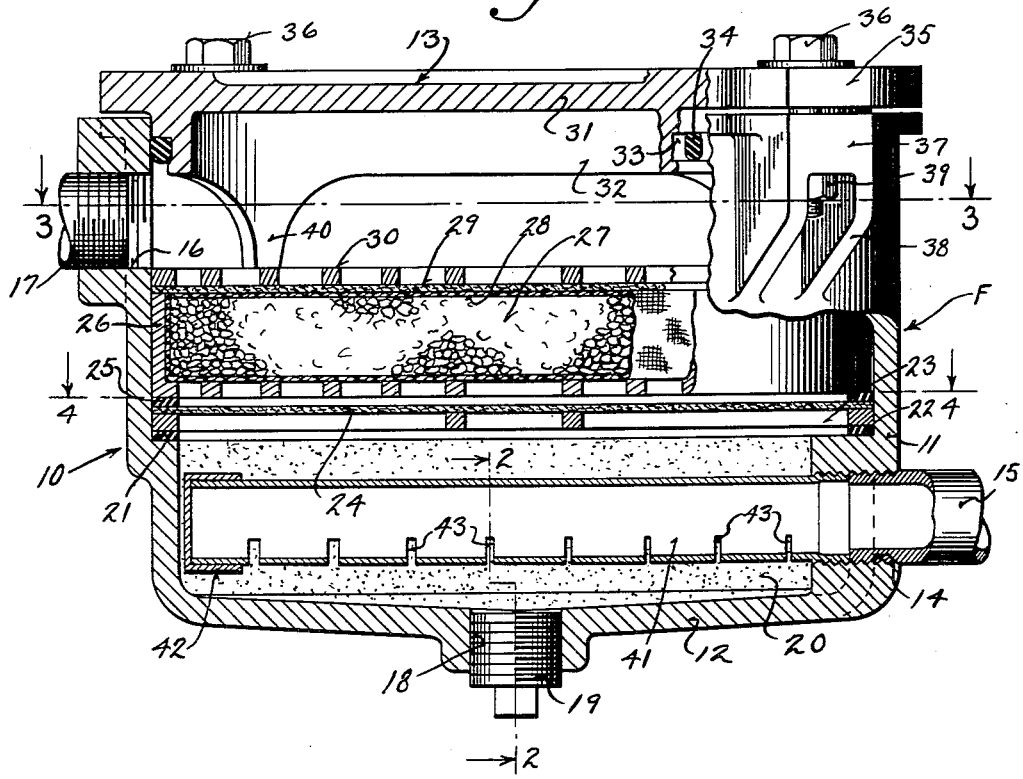

Referring to the drawings in detail, wherein similar reference characters designate corresponding parts throughout the several views, the letter F generally indicates my improved filter and the same includes a casing or bowl 10. The bowl is of a rugged character and is formed of rust-proof material, such as bronze. The bowl includes an annular side wall 11 and a bottom wall 12. The upper end is tightly closed by a cover 13 and this cover will be later referred to. The lower end of the bowl is provided with an inlet opening 14 for water, preferably formed in the side wall thereof, and this opening is tapped for the reception of an inlet pipe 15 or a pipe coupling, as the case may be. The upper end of the bowl has formed therein an outlet opening 16 and this opening is also tapped for the reception of an outlet pipe 17 or pipe coupling, as the case may be. The axial center of the bottom wall 12 is provided with a wash-out opening 18 and this opening is normally closed by a threaded plug 19.

In accordance with my invention, the lower end of the bowl is filled with loose filtering material such as a preferred type of silica, namely, a diatomaceous silica 20, and the inner surface of the wall 11 above this filtering material 20 has ground thereon an annular seat for a rubber sealing gasket 22 and fitted against the gasket is a metal retaining plate 23 having openings and slots therein to permit the free flow of water therethrough. This plate 23 forms a support for a fabric filter and filter retaining pad 24 and this pad forms an important part of the invention, as will be later brought out. A second rubber sealing gasket 25 is placed on top of the pad 24 at the outer edge thereof and seated on this gasket is an open cage 26 for the reception of a second strata of filtering material 27. This filtering material 27 can be activated carbon. In actual practice, a measured quantity of the carbon is placed within a fabric bag 28 and the bag and the carbon are placed within their retaining cage 26, as a unit. Fitted on the top edge of the cage against the activated carbon is a second fabric filter retaining pad 29 and this pad is held in place by a top retaining plate 30 which is also provided with slots or openings to permit the free passage of water therethrough. It is to be noted that the outlet opening 16 is above the upper surface of the retaining plate 30.

Figure 3:
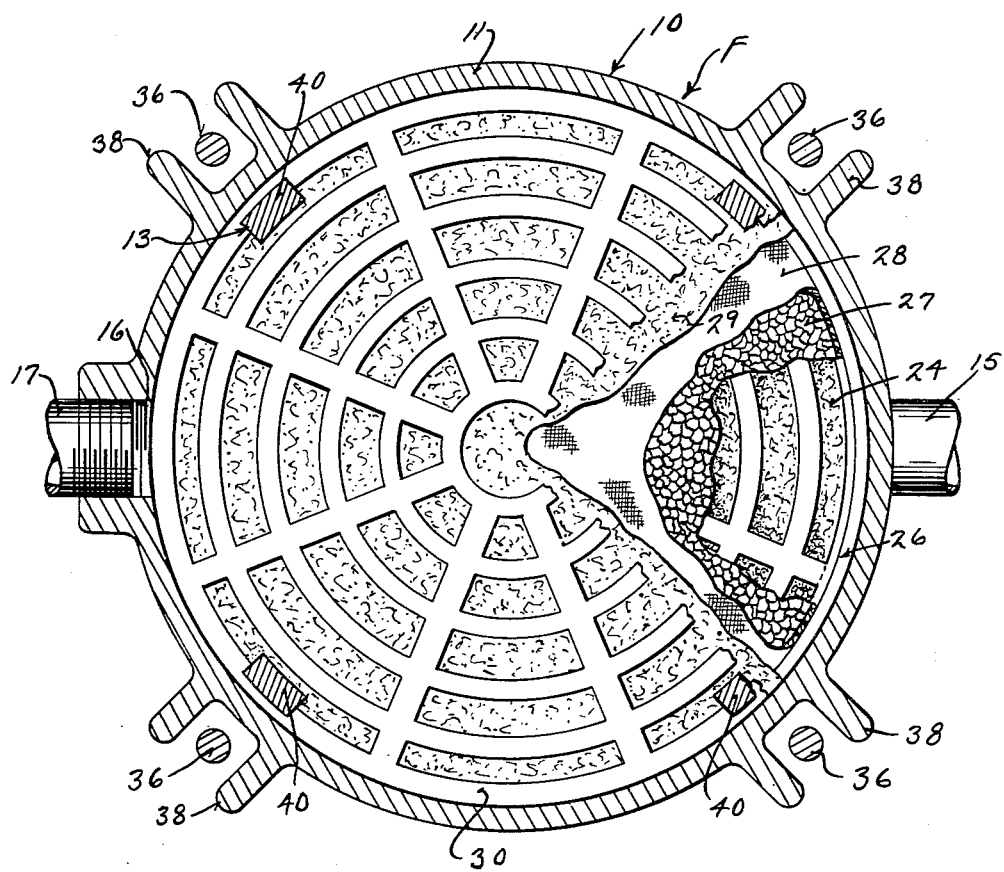
Figure 3 is a horizontal sectional view through the filter taken on the line 3—3 of Figure 1, looking in the direction of the arrows and toward the filtering media.

Now referring back to the cover 13, the same includes a substantially disc shaped top plate 31 having formed on its lower surface inwardly of its periphery a depending annular flange 32 which is adapted to fit snugly within the bowl or casing 10. The outer surface of the flange 32 is provided with a groove 33 for the reception of a sealing O-ring 34. At spaced points the cover is provided with laterally extending apertured ears 35 for the reception of headed retaining machine bolts 36. The bolts extend through ears 37 formed on the side wall 11 of the bowl or casing adjacent to the upper end thereof and these ears 37 are provided with reinforcing webs 38. In practice, the bolts 36 are passed through the ears 35 and 37 and nuts 39 are placed between the webs 38 and are held against rotation by the webs. By rotating the bolts, the cover 13 can be drawn down tight and in sealing contact with the bowl or casing 10. As best shown in Figures 1 and 3, the flange 32 on the casing has formed thereon depending feet 40 which abut against the upper surface of the top retaining plate 30. Hence, when the cover is drawn down tight the feet press against the plate 30 and place pressure on said plate, cage 26, sealing ring 25, plate 23 and sealing ring 22. The filtering retaining pad 24 is thus tightly held in place as are other parts of the filter. Hence, bypassing of water around the activated carbon is prevented.

Figure 2:
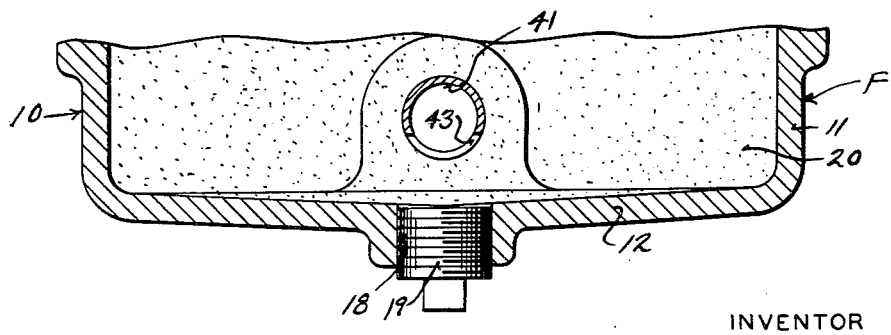
Figure 2 is a fragmentary vertical sectional view through the filter, the section being taken on the line 2—2 of Figure 1, looking in the direction of the arrows.
Figure 4:
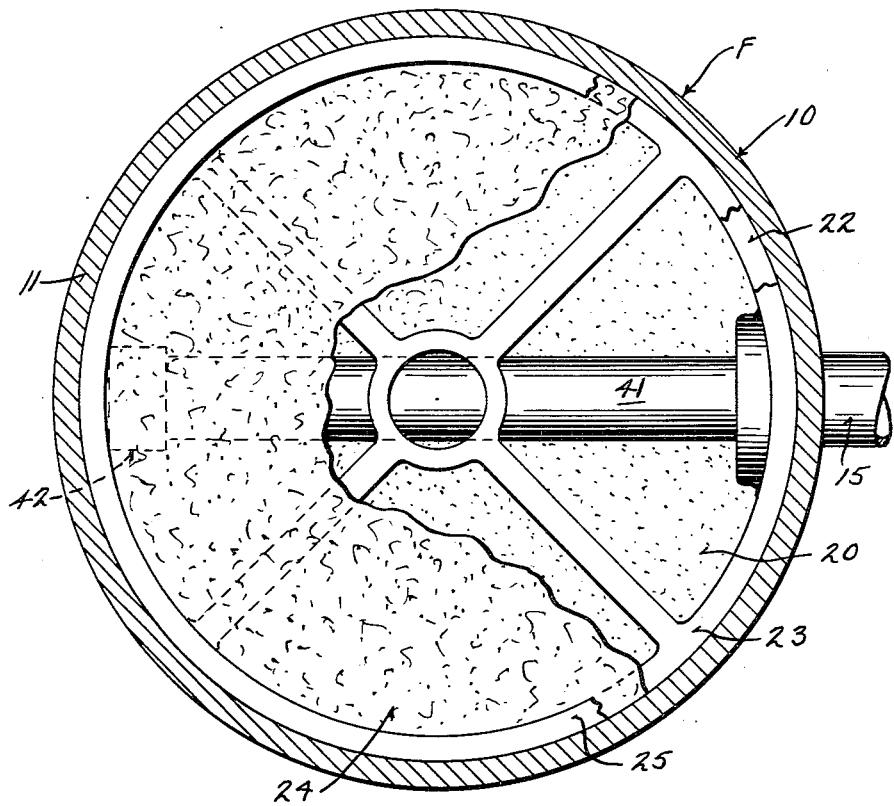
Figure 4 is a horizontal sectional view through the filter taken on the line 4—4 of Figure 1, looking in the direction of the arrows.

I prefer to provide means for distributing the incoming water throughout the filtering silica 20 and this can be accomplished in different ways. As shown in Figures 1, 2 and 4 a tube 41 can be threaded in the inlet opening 14 in advance of the pipe 15 and this tube extends diametrically across the bowl. The inner end of the tube 41 can be closed by a cap 42. The lower part of the tube is cut to provide outlet slots 43 and these slots preferably increase in width from the inlet end thereof toward the cap 42. Hence incoming water flows through the tube and out of the slots 43 and initially flows down and out from the tube into the filtering silica bed 20.

When the parts are assembled, as just described, and when water under pressure enters the casing or bowl, such water will percolate through the silica bed 20 and actually raise part of the bed up and pack said part against the filter retaining pad 24. The water then flows up through the activated carbon 27 and out of the pipe 17.

When water ceases to be drawn through the pipe 17 the silica has a tendency to drop down again into the bowl and when water is again withdrawn through the pipe 17 and water flows through the bowl the silica will be reagitated and thus bring new surface into play for retaining foreign matter.

When the filter medium becomes totally impregnated with foreign matter it is merely necessary to shut off the inlet and outlet of water to and from the casing and to remove the cover 13. At this time, the retaining plate 30 is removed together with the bag of activated carbon and retaining pad 29, along with the cage 26 and the retaining filtering pad 24. The plug 24 is removed and the bowl is thoroughly washed out and the soiled silica is also washed out through the drain opening 18. After washing, the plug 19 is replaced, a new silica bed is poured into the bowl and the other parts are replaced and held in position by the cover.

Figure 5:
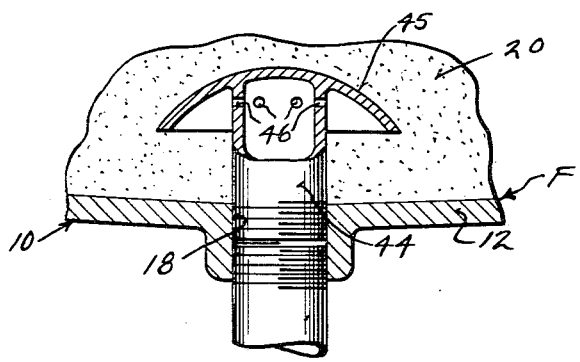
Figure 5 is a detail fragmentary sectional view taken through the bottom of the filter casing and showing a modified form of means for introducing the water to be filtered into the filter bowl.

Other means can be utilized for distributing the water through the filter silica bed 20 and one other preferred type of means is shown in Figure 5 of the drawings. As illustrated in Figure 5, the bottom opening 18 can be utilized as an inlet opening and in this case a distributing head 44 is threaded into the opening 18. The upper end of the head is provided with a downwardly curved apron 45 which forms a part of a hollow sphere and the head 44 adjacent to the apron 45 is provided with outlet openings 46. The opening 14 can in this case be used as a drain and wash-out opening and such opening 14 would then be closed by a removable plug.

Great stress is laid on the use of the filter retaining pads 24 and 29. The pad 24 effectively holds the silica 20 in the bottom part of the bowl and should this pad become ruptured through any reason, the second pad 29 will hold the silica against percolation in the water and out of the pipe 17. The pad 29 also performs its primary purpose of preventing the exit of any activated carbon with the water being filtered.

From the foregoing description, it can be seen that I have provided an exceptionally simple but durable form of water filter which will effectively accomplish its desired purpose and one in which the filtering media can be replaced by a layman or householder.

Various changes in details may be made without departing from the spirit or the scope of this invention, but what I claim as new is:

1. A water filter comprising a bowl having a side wall and a bottom wall, a removable cover plate for the bowl, a filtering bed of silica in the lower part of said bowl and said bowl having a water inlet at said filtering bed and a removable wash-out plug, a shoulder formed on the side wall of the bowl above said filtering bed, a lower perforated retaining plate, a filtering pad on said lower retaining plate, and sealing gaskets engaging the lower surface of the lower retaining plate and said shoulder and the upper surface of the pad, an open cage fitted upon one of the gaskets, a bag of filtering material in said cage, an upper retaining plate for said cage and bag of filtering material and means for holding the cage, the upper and lower retaining plates and pad in said bowl with one of said gaskets tightly sealed on the shoulder.

2. A water filter as defined in claim 1, said means for holding the cage, the upper and lower retaining plates and pad in said bowl including depending feet on the cover extending into the bowl and engaging said upper retaining plate.

3. A water filter comprising a bowl including a side wall and a bottom wall, a filtering bed of silica in the lower part of said bowl and said bowl having a water inlet at said filter bed and a removable wash-out plug, a shoulder formed on the side wall of the bowl above said filtering bed, a perforated retaining plate, a filtering pad on said plate for retaining the filtering bed in the bowl, a sealing gasket interposed between the lower surface of the plate and said shoulder, an open cage fitted upon said filtering pad for retaining the pad in position, a bag of filtering material in said cage, a retaining plate for said bag fitted on said cage, a removable cover fitted on said bowl, adjustable bolts connecting the cover with the bowl, and depending feet on the cover engaging said second retaining plate upon the tightening of the bolts.

References Cited in the file of this patent

UNITED STATES PATENTS

| | | |
|---|---|---|
| 1,997,830 | Michaud | Apr. 16, 1935 |
| 2,048,350 | McLean | July 21, 1936 |
| 2,101,961 | Slidell | Dec. 14, 1937 |
| 2,168,997 | Lankes et al. | Aug. 8, 1939 |